United States Patent Office 3,826,663
Patented July 30, 1974

3,826,663
PLASTER ADDITIVE AND PLASTER COMPOSITIONS
Alexander S. Minicozzi and Alexander S. Minicozzi, Jr., Locus Valley, N.Y. (both c/o Arma Research Corp., 405 Oakwood Road, Huntington Station, N.Y. 11746)
No Drawing. Continuation-in-part of abandoned application Ser. No. 82,156, Oct. 19, 1970. This application Oct. 27, 1972, Ser. No. 301,364
Int. Cl. C04b 7/02, 7/34
U.S. Cl. 106—90                              37 Claims

ABSTRACT OF THE DISCLOSURE

The invention provides a plaster additive comprising component (A) the saponified reaction product of at least one alkali metal carbonate with at least one fatty acid having about 16–18 carbon atoms, about 5.5 to about 8.5 parts by weight of aluminum potassium sulfate and about 25 to about 70 parts silica, the total of said saponified reaction product of said alkali metal carbonate and said fatty acid being about equal to the total of said two other noted components; and component (B) comprising at least two materials selected from the group consisting of (i) polyvinyl alcohol, (ii) polyvinyl acetate, and (iii) at least one alkali metal or ammonium salt of lignin sulphonate, each of said components (i), (ii) and/or (iii) when included in component (B) being at least 3% thereof; the ratio of component (A) to component (B) being from about 16:1 to 16:16. It also provides an improved lime plaster composition containing about 75 parts of hydrated lime and between about 1 and 7 parts of said additive. The invention further provides an improved cement plaster composition comprising about 75 parts of portland cement, between 20 and 150 parts of stone, a setting retarder, and between 1 and 7 parts of said additive.

---

This application is a continuation-in-part of our application Ser. No. 82,156, file Oct. 19, 1970, and now abandoned.

The application of plaster as a wall facing material is an ancient art. Special preparation of the basis surface is often required. Most plaster cannot be applied in a thick coat, i.e., more than about $\frac{1}{16}''$ to $\frac{1}{4}''$. Checking, i.e., fine alligator cracking, of plaster is common during application. It is difficult to form joints with many plaster compositions so that it is necessary to plaster an entire segment of a wall or room without interruption.

As a result of the many difficulties recognized by the art, plaster compositions and application techniques have been compromises. The usual lime plaster wall was laid on in three separate layers. Cement plaster usually required a scratch coat. It has also been difficult to apply a thin continuous sound cement plaster coating. The foregoing difficulties generally involved low productivity which is economically compounded by the high wages earned by plasterers have resulted in widespread use of other wall covering materials. Although new plaster compositions have appeared on the market recently which claims to be useful in one-coat applications, the plaster appears to have deficiencies in terms of requisite basis surface preparation and/or limitations in the manner and time and total thickness of plaster which may be applied. The present invention provides plaster compositions which may be applied on a wide variety of surfaces and which may be applied in great variations of thicknesses to produce sound plaster coatings.

The present invention provides improved lime plaster compositions containing for about 50 parts of hydrated lime, between about 1 and 7 parts of the plaster additive specified hereinafter. The lime plaster compositions preferably also contain finely subdivided filler, preferably stone in a ratio of stone to lime of between about 1:1 and 1:4, and preferably between about 1:2 and 1:3, with optimum results with a ratio of about 1:2.5.

The present invention also provides an improved cement plaster containing for about 75 parts of portland cement, between about 1 and 7 parts of the plaster additive specified hereinafter. A smooth cement plaster preferably contains between about 20 and 30 parts of stone. A very coarse (stucco) cement plaster which is preferably applied as a stucco preferably contains between about 75 and 150 parts of stone. The cement plaster may contain up to 75 parts of hydrated lime, i.e., 10–75 parts and preferably contains between about 25 and 75 parts of hydrated lime. The cement plaster may contain a setting inhibitor.

The plaster additive which is a necessary component of the improved lime plaster and cement plaster of the present invention comprises component (A) and component (B).

Component (A) consists essentially of the saponified reaction product of at least one alkali metal carbonate with at least one fatty acid having about 16–18 carbon atoms, about 5.5 to about 8.5 parts of aluminum potassium sulfate, and about 25 to about 70 parts silica, the total of said reaction product of said alkali metal carbonate and said fatty acid being about equal to the total two other noted components. Component (A) preferably also contains between about 5 and about 25.5 parts of aluminum silicate (kaolin). When kaolin is included in the additive composition, the total of said reaction product of said carbonate and said fatty acid is preferably about equal to the total of said silica, aluminum potassium sulfate, and aluminum silicate.

Component (B) comprises at least two materials selected from the group consisting of (i) polyvinyl alcohol, (ii) polyvinyl acetate, and (iii) an alkali metal or ammonium salt of lignin sulphonate. Each of said components (i), (ii) and/or (iii) when included in component (B) are in an amount of at least 3% of said component (B). The ratio of component (A) to component (B) in the plaster additive is from about 16:1 to about 16:16 and preferably between about 16:2.5 and 16:5.

The preparation of component (A) is disclosed in U.S. Pat. No. 3,366,502, issued Jan. 30, 1968 which is hereby incorporated herein in its entirely. Where said patent refers to "%," it should be read "parts" insofar as its disclosure is pertinent to the subject matter herein.

Component (B) preferably contains at least 30% of an alkali metal or ammonium salt of lignin sulphonate. Lignin sulphonate is generally prepared by the treatment of wood chips with sulphurous acid and is often obtained in admixture with sugars. Compositions containing ammonium lignin sulphonate plus the residual wood sugars are useful as the lignin sulphonate source. Other lignin sulphonates, e.g., the sodium salt, or the acid per se, may be used in the preparation of component (B).

The polyvinyl alcohol is available as a powder and preferably has a molecular weight of between about 3,000 to 15,000, e.g., about 10,000. The polyvinyl acetate is preferably utilized as a solid powder, in the form of an emulsion. It preferably has a molecular weight between about 20,000 and 40,000.

The following are two preferred component (B) compositions.

Lignin sulphonate 40%–60%, and polyvinyl acetate 60%–40%.

Lignin sulphonate 90%–97% and polyvinyl alcohol 10%–3%.

The preferred component (B) compositions may also contain such additional additives as the alkaline earth and alkali metal salts of long chain fatty acids, such as calcium stearate, and gummy materials such as gum arabic. A preferred component (B) composition contains between about ½ and 3 parts of the lignin sulphonate, between about 1 and 5 parts of polyvinyl alcohol, between about 1 and 10 parts of polyvinyl acetate, between about 2 and 8 parts of calcium stearate, and between 1¼ and 4 parts of gum arabic.

When the component (B) is composed of polyvinyl alcohol and polyviny lacetate, the ratio of one to the other may vary from about 1:4 to 4:1. Another preferred component (B) composition contains between about 3% and 20% polyvinyl alcohol and between about 80% and 97% polyvinyl acetate. A preferred component (B) for use with the stucco cement plaster contains about 50% of the lignin sulphonate with the remainder polyvinyl alcohol and polyvinyl acetate, preferably in a ratio of about 1:4.

The amount of the plaster additive in the plaster is between about 1% and about 7%, and preferably between about 1% and about 5%. Larger amounts of additive do not increase their effectiveness and are unduly costly. The optimum additive range is between about 1.5% and 2.5%.

Component (A) is preferably prepared by admixing the aqueous metallic soap solution prepared by reacting the fatty acid with the alkali metal carbonate, with the noted additions of the aluminum potassium sulphate, the aluminum silicate, and the silica, and boiling all the components until a smooth colloidal solution is formed. This solution is then dried and pulverized. Component (B) is prepared by dissolving in a separate aqueous solution the polyvinyl acetate, the polyvinyl alcohol and/or the lignin sulphonate. Other components, if utilized, are added to this solution. The solution is brought to a boil with agitation until it becomes a homogeneous paste. The resulting paste is then dehydrated, pulverized and admixed with the dried component (A). Alternatively, the paste may be admixed with the colloidal solution of component (A) and the entire mixture then dehydrated and pulverized.

The plaster compositions are prepared by admixing the lime plaster or the cement, the filler, preferably finely subdivided stone, and the plaster additive, in a dry blender until a homogeneous mixture is obtained. The plaster compositions may also include such conventional adjuvants as coloring agents, setting inhibitors, which are usually organic colloidal substances, such as flour, glue, and various proprietary mixtures based on carboxylic acid, etc.

The finely subdivided filler is used to provide body and hardness. It may be a finely subdivided stone, such as limestone, commercial sand, marble dust, perlite, vermiculite, expanded shale, a slag such as foundry residue, or a material such as steel filings or resin-coated glass fibers, gypsum or a mixture thereof.

A lime plaster according to the present invention containing for example 50 parts of hydrated lime, 20 parts of limestone, and 1.5 parts of the additive are blended and packaged. The package is delivered to the building site and stored until needed. The usual practice is to slake the mixture by soaking in water about one day before it is to be applied. Guaging plaster (plaster of Paris) may be admixed by the plasterer and the plaster applied. The amount of guaging plaster added is usually between about 10 and 80 parts per 50–80 parts of hydrated lime; the amount added depends upon the setting time of the composition, upon the amount of plaster to be applied in a given time which is partially dependent upon the area of wall surface covered and thickness applied, and in part upon the number of workmen applying plaster from the same source. In practice it has been found that a single coat may be applied in thicknesses up to ¾". There is excellent adhesion of the plaster to the wall.

There is excellent joining and adhesion of later applied plaster to earlier applied plaster. The plaster is readily worked by the plasterer. It dries readily without checking.

Instead of adding the guaging plaster on the construction site, it may be pre-mixed with the other components, i.e., the hydrated lime, the limestone, and the additive, to produce a manufactured and packaged product requiring minimal on-site preparation. Such compositions would contain, in addition to the lime, limestone and additive in the aforespecified amounts, guaging plaster in an amount to provide a lime:guaging plaster ratio of between 3:1 and 10:10.

The cement plaster containing the portland cement, the limestone, the plaster additive, and a setting retarder, is blended and packaged. Water is added at the building site and the plaster applied directly over the surface to be covered. It may be applied in extremely thin layers, e.g., 1/16" thick, to relatively thick layer, e.g. ½ to ¾" thick. No preparatory scratch coat is required. The cement plaster makes the surface impervious to water. When added in appreciable thicknesses, it physically strengthens the structure. The ability to vary the thickness of the layer permits application to relatively rough surfaces without compromising the smoothness of the finish.

The cement plaster applied as a smooth (usually wall) layer preferably contains between about 23 and 26 parts of finely subdivided stone.

Inclusion in the cement plaster composition of more than about 30 parts of stone results in a visual coarsening of the texture of the finished plaster. Addition of small amounts of hydrated lime, e.g., 2–5 parts per 30–50 parts of stone is preferred to improve the workability of the plaster. This coarseness is advantageously used in the application of a stucco finish utilizing compositions preferably containing between about 75 and 150 parts of stone and between about 10 and 45 parts of hydrated lime. The hydrated lime improves the workability of the plaster, with increasing additions from 10 to 45 parts as the stone content increases from 75 parts to 150 parts.

Some cement plaster (particularly those without lime, or with a low lime content) require a setting inhibitor to prevent the cement plaster from setting when the water is added. Setting inhibitors are usually colloidal substances such as flour, glue, and long-chain hydrocarbon derivatives. The amount of inhibition and the time before onset of setting effected by different setting inhibitors varies dependent on the specific inhibitor used and the concentration thereof in the commercially available form. For use with such plasters we generally prefer a time before setting of between about ¾ and 1 hour and preferably obtain this result by adding about ¼ part of Plastiment" (a carboxylic acid derivative) marketed by the Sika Chemical Company, per 30 parts of cement in the composition. The effective amount of different inhibitors is readily determined by test.

Cement plasters containing a relatively high hydrated lime content, e.g. a lime:cement ratio of 1:3 to 1:1, do not require a setting inhibitor, because the lime also functions as a setting inhibitor.

The stucco cement plaster is brushed on or is preferably sprayed from a hose. The composition is dissolved in water to form a dispersion having an appearance of being somewhat thicker than a heavy or very thick paint. A layer is usually between about 1/16" and ⅛" thick. It dries quickly and sequential layers may be applied with excellent adhesion between layers.

The cement plasters may also include such other adjuvants as coloring agents, etc.

The lime plaster and the cement plaster may be applied to the widest variety of surface materials. They may be applied over cement walls, cement block, masonry, plaster board, rough plaster, over wood lath, metal lath and porosity board, rock lath, sheet rock, Styrofoam, urethane, etc.

The invention is further illustrated in the Examples. All parts and percentages in the specification and claims are by weight unless otherwise specified.

EXAMPLE 1

Five pounds of component (A) were prepared using the components and following the procedure set forth in Example 1 of U.S. Pat. 3,366,502, except that a fatty acid which was a mixture of fatty acids (largely oleic acid and including some glycerides) was used instead of the specified "white olefin."

EXAMPLE 2

One pound of a component (B) mixture was prepared by dissolving 0.6 pounds of polyvinyl acetate and water and then adding 0.4 pounds of a commercial ammonium lignin sulphonate containing residual wood sugars to the water and boiling until a homogeneous mixture was prepared. Portions of this solution were then added to portions of the paste of Example 1 and mixed vigorously while the entire mixture was boiling to insure a homogeneous composition. The resulting paste was then dried and pulverized.

The ammonium lignin sulphonate used was the product sold by Crown Zellerbach Company under the trademark "Orzan A." Similar products were prepared using a commerical sodium lignin sulphonate.

EXAMPLE 3

The procedure of Example 2 was followed except that 0.95 pounds of the ammonium lignin sulphonate was admixed with 0.5 pounds of polyvinyl alcohol.

EXAMPLE 4

The procedure of Example 2 was followed by admixing in boiling water one part of ammonium lignin sulphonate, two parts of polyvinyl alcohol, two parts of gum arabic, and four parts of calcium stearate until a homogeneous solution was formed. This was then added to the paste mixture of component (A) described in Example 1.

EXAMPLE 5

Eight parts of polyvinyl acetate was admixed with two parts of polyvinyl alcohol by adding both to boiling water and mixing until homogeneous. The homogeneous mixture was then added in a desired amount to the paste composition of component (A) described in Example 1.

EXAMPLE 6

A lime plaster was prepared by mixing 50 parts of hydrated lime; 20 parts of limestone having a density of 80–90 lbs./cu. ft. with 99% retained on a No. 40 sieve screen, at least 70% retained on a No. 60 sieve screen and with at least 90% retained on a No. 100 sieve screen; and 1 part of an additive prepared by admixing 5 parts of component (A) from Example 1 and 1 part of component (B) from Example 4. A similar lime plaster was prepared except that component (A) differed from that of Example 1 only that it did not contain the potassium carbonate and the kaolin.

EXAMPLE 7

A lime plaster similar to that of Example 6 was prepared by using the components specified therein except that the limestone was omitted. Then plaster has the desirable application properties disclosed hereinbefore which are shared with a surface prepared from the plaster of Example 6 except that the lime plaster prepared without limestone has a softer surface.

EXAMPLE 8

A lime plaster composition was prepared as in Example 6 except that 50 parts of limestone were used and 3 parts of an additive obtained by admixing 1 part of component (A) from Example 1 and 1 part of component (B) from Example 4.

EXAMPLE 9

A lime plaster composition was prepared as in Example 6 except that 25 parts of limestone were used and 2 parts of an additive obtained by admixing 16 parts of component (A) from Example 1 and 5 parts of component (B) from Example 2.

EXAMPLE 10

A lime plaster composition was prepared as in Example 6 except that 20 parts of limestone were used and 1 part of an additive obtained by admixing 4 parts of component (A) from Example 1 and 1 part of component (B) from Example 5.

EXAMPLE 11

A lime plaster composition was prepared as in Example 6 except that 30 parts of limestone were used and 3 parts of an additive obtained by admixing 16 parts of component (A) from Example 1 and 2 parts of component (B) from Example 3.

EXAMPLE 12

A lime plaster composition was prepared as in Example 6 except that (i) 25 parts of limestone was used and (ii) 7 parts of the following component (B): 0.5 part of ammonium lignin sulphonate, 3 parts of polyvinyl alcohol, 6 parts of polyvinyl acetate, 4 parts of calcium stearate, and 2 parts of gum arabic.

EXAMPLE 13

A lime plaster was prepared as in Example 12, except that 12.5 parts of guaging plaster (plaster of Paris) was admixed with the hydrated lime, limestone, and additive.

EXAMPLE 14

A cement plaster was prepared by admixing 30 parts of portland cement; 10 parts of limestone; ½ part of an additive obtained by admixing 16 parts of component (A) from Example 1 and 1 part of component (B) from Example 5, and ½ part of a second additive prepared by admixing 1 part of component (A) from Example 1 and 1 part of component (B) from Example 4; and ¼ part of a solid commercial cement setting retarder which is a carboxylic acid derivative sold commercially as "Plastiment" by the Sika Chemical Company.

EXAMPLE 15

A cement plaster was prepared by admixing 30 parts of portland cement; 15 parts of limestone; ½ part of an additive obtained by admixing 16 parts of component (A) from Example 1 and 1 part of component (B) from Example 3; and ¼ part of said setting retarder.

EXAMPLE 16

A cement plaster was prepared by admixing 30 parts of portland cement; 10 parts of limestone; 0.80 part of an additive obtained by admixing 5 parts of component (A) from Example 1 and 1 part of component (B) from Example 2; and ¼ part of said setting retarder.

EXAMPLE 17

A cement plaster was prepared by admixing 30 parts of portland cement; 30 parts of limestone; 1 part of an additive obtained by admixing 4 parts of component (A) from Example 1 and 1 part of component (B) from Example 3, and ½ part of a second additive prepared by admixing 16 parts of component (A) from Example 1 and 3 parts of component (B) from Example 2; and ¼ part of said setting retarder.

EXAMPLE 18

A stucco cement plaster composition was prepared by admixing 75 parts of portland cement, 80 parts of limestone, 12 parts of hydrated lime, 4 parts of salt (sodium chloride), ½ part of said setting retarder, and a total of 1.7 parts of a plaster additive. The plaster additive was prepared by admixing 10 parts of component (A) of Example 1 with 8 parts of component (B) of Example 5 and an additional 8 parts of ammonium lignin sulphonate.

EXAMPLE 19

Following the procedure of Example 18, a stucco cement plaster composition was prepared using 75 parts of portland cement, 90 parts of limestone, 15 parts of hydrated lime, ½ part of said setting retarder and a total of 2.5 parts of plaster additive. The plaster additive was prepared by combining component (A) of Example 1 with component (B) of Example 5 in a ratio of 16:4.

EXAMPLE 20

Following the procedure of Example 18, a stucco cement plaster composition was prepared using 75 parts of cement, 100 parts of limestone, 20 parts of hydrated lime, ½ part of said setting retarder and a total of 2 parts of plaster additive. One part of said plaster additive was an admixture of component (A) of Example 1 with component (B) of Example 3 in a ratio of 16:5, and a second part of an admixture of component (A) of Example 1 with component (B) of Example 2 in a ratio of 16:5.

EXAMPLE 21

Following the procedure of Example 18, a stucco cement plaster composition was prepared using 75 parts of portland cement, 150 parts of limestone, 30 parts of hydrated lime, 4 parts of salt, and ½ part of said setting retarder and 2 parts of a plaster additive prepared by admixing component (A) of Example 1 with component (B) of Example 3 in a ratio of 16:3.

EXAMPLE 22

Following the procedure of Example 18, a stucco cement plaster composition was prepared using 75 parts of portland cement, 75 parts of limestone, 15 parts of hydrated lime, ½ part of said setting retarder and a total of 2.5 parts of plaster additive. 1.5 parts of said plaster additive were an admixture of component (A) of Example 1 with component (B) of Example 3 in a ratio of 16:2, and one part of said plaster additive was an admixture of component (A) of Example 1 with component (B) of Example 5 in a ratio of 16:2.

EXAMPLE 23

A stucco cement plaster composition was prepared by admixing 95 parts of portland cement, 100 parts of limestone, 40 parts of hydrated lime, 4 parts of salt, and a total of 1 part of the plaster additive defined in Example 18.

EXAMPLE 24

A stucco cement plaster composition was prepared as in Example 23 except that a total of 10 parts of the plaster additive defined in Example 12 was used.

Similar compositions have been prepared using as the filler, in place of the heretofore exemplified limestone, commercial sand, marble dust, perlite, vermiculite, expanded shale, foundry residues, steel filings and resin-coated glass fibers.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. A plaster additive consisting essentially of component (A) the saponified reaction product of at least one alkali metal carbonate with at least one fatty acid having about 16–18 carbon atoms, about 5.5 to about 8.5 parts by weight of aluminum potassium sulfate and about 25 to about 70 parts silica, the total of said saponified reaction product of said alkali metal carbonate and said fatty acid being about equal to the total of said two other noted components; and component (B) comprising at least two materials selected from the group consisting of (i) polyvinyl alcohol, (ii) polyvinyl acetate, and (iii) at least one alkali metal or ammonium salt of lignin sulphonate, each of said components (i), (ii) and/or (iii) when included in component (B) being at least 3% by weight thereof; the ratio of component (A) to component (B) being from about 16:1 to 16:16.

2. The additive of Claim 1 wherein component (A) also contains between about 5 and 25.5 parts of aluminum silicate, with the total of aluminum silicate, silica and aluminum potassium sulfate being about equal to the total of said saponified reaction product; and wherein said ratio of component (A) to component (B) is between about 16:1 and 16:5.

3. The additive of Claim 2 wherein component (B) contains at least about 30% of said lignin sulphonate.

4. The additive of Claim 3 wherein component (B) contains between 40% and 60% of ammonium lignin sulphonate and between about 60% and 40% of polyvinyl acetate.

5. The additive of Claim 4 containing about 40% of said ammonium lignin sulphonate and about 60% of said polyvinyl acetate.

6. The additive of Claim 3 wherein component (B) contains between about 90% and 97% of ammonium lignin sulphonate and between about 10% and 3% of polyvinyl alcohol.

7. The additive of Claim 6 containing about 95% of said ammonium lignin sulphonate and about 5% of said polyvinyl alcohol.

8. The additive of Claim 3 wherein component (B) contains between about ½ and 3 parts of ammonium lignin sulphonate and between about 1 and 5 parts of polyvinyl alcohol, between about 1 and 10 parts of polyvinyl acetate, between about 2 and 8 parts of calcium stearate, and between about 1¼ and 4 parts of gum arabic.

9. The additive of Claim 8 containing about 0.5 part of ammonium lignin sulphonate, about 3 parts of polyvinyl alcohol, about 6 parts of polyvinyl acetate, about 4 parts of calcium stearate, and about 2 parts of gum arabic.

10. The additive of Claim 3 containing about 1 part of said ammonium lignin sulphonate, about 2 parts of said polyvinyl alcohol, about 4 parts of said calcium stearate, and about 2 parts of said gum arabic.

11. The additive of Claim 2 wherein component (B) contains polyvinyl alcohol and polyvinyl acetate in a ratio of between about 1:4 and 4:1.

12. The additive of Claim 2 wherein component (B) contains between about 3 and 20% of said polyvinyl alcohol and between about 80% and 97% of said polyvinyl acetate.

13. The additive of Claim 12 which additionally contains ammonium lignin sulphonate in an amount about equal to the total of said polyvinyl alcohol and polyvinyl acetate.

14. An improved lime plaster composition comprising about 50 parts by weight of hydrated lime; and between about 1 and 7 parts of a plaster additive consisting essentially of component (A) the saponified reaction product of at least one alkali metal carbonate with at least one fatty acid having about 16–18 carbon atoms, about 5.5 to about 8.5 parts by weight of aluminum potassium sulfate and about 25 to about 70 parts silica, the total of said saponified reaction product of said alkali metal carbonate and said fatty acid being about equal to the total of said two other noted components; and component (B) comprising at least two materials selected from the group consisting of (i) polyvinyl alcohol, (ii) polyvinyl acetate, and (iii) at least one alkali metal or ammonium salt of lignin sulphonate, each of said components (i), (ii) and/or (iii) when included in component (B) being at least 3% by weight thereof; the ratio of component (A) to component (B) being from about 16:1 to 16:16.

15. The improved plaster composition of Claim 14 containing finely subdivided stone, the ratio of said stone to said hydrated lime being between about 1:1 and 1:4 and containing up to about 5 parts of a plaster additive consisting essentially of component (A) the saponified reaction product of at least one alkali metal carbonate with at least one fatty acid having about 16–18 carbon atoms, about 5.5 to about 8.5 parts by weight of aluminum potassium sulfate, between about 5 and 25.5 parts of aluminum silicate, and about 25 to about 70 parts silica, the total of said saponified reaction product of said alkali metal carbonate and said fatty acid being about equal to the total of said three other noted components; and component (B) comprising at least two materials selected from the group consisting of (i) polyvinyl alcohol, (ii) polyvinyl acetate, and (iii) at least one alkali metal or ammonium salt of lignin sulphonate, each of said components (i), (ii) and/or (iii) when included in component (B) being at least 3% by weight thereof; the ratio of component (A) to component (B) being from about 16:1 to 16:5.

16. The improved plaster composition of Claim 15 wherein said stone is limestone, wherein said ratio is between 1:2 and 1:3, and contains between about 1.5 and 2.5 parts of said plaster additive.

17. The improved plaster composition of Claim 16 wherein said plaster additive consists essentially of component (A), the saponified reaction product of at least one alkali metal carbonate with at least one fatty acid having about 16–18 carbon atoms, about 5.5 to about 8.5 parts by weight of aluminum potassium sulfate, between about 5 and 25.5 parts of aluminum silicate, and about 25 to about 70 parts silica, the total of said saponified reaction product of said alkali metal carbonate and said fatty acid being about equal to the total of said three other noted components; and component (B) comprising between about 1 and 5 parts of polyvinyl alcohol, between about ½ and 3 parts of said lignin sulphonate, between about 2 and 8 parts of calcium stearate and between about 1¼ and 4 parts of gum arabic.

18. The improved plaster composition of Claim 17 containing about 2 parts of said polyvinyl alcohol, about 1 part of said sulphonate, about 4 parts of said stearate, and about 2 parts of said gum arabic.

19. The improved plaster composition of Claim 17 wherein said component (B) also contains between about 1 and 10 parts of polyvinyl acetate.

20. The improved plaster composition of Claim 16 wherein said plaster additive consists essentially of component (A) the saponified reaction product of at least one alkali metal carbonate with at least one fatty acid having about 16–18 carbon atoms, about 5.5 to about 8.5 parts by weight of aluminum potassium sulfate, between about 5 and 25.5 parts aluminum silicate, and about 25 to about 70 parts silica, the total of said saponified reaction product of said alkali metal carbonate and said fatty acid being about equal to the total of said three other noted components; and component (B) comprising between about 40% by weight and 60% of ammonium lignin sulphonate and between about 60% and 40% of polyvinyl acetate.

21. The improved plaster composition of Claim 16 wherein said plaster additive consists essentially of component (A) the saponified reaction product of at least one alkali metal carbonate with at least one fatty acid having about 16–18 carbon atoms, about 5.5 to about 8.5 parts by weight of aluminum potassium sulfate, between about 5 and 25.5 parts of aluminum silicate, and about 25 to about 70 parts silica, the total of said saponified reaction product of said alkali metal carbonate and said fatty acid being about equal to the total of said two other noted components; and component (B) comprising between about 3 and 20% by weight polyvinyl alcohol and between about 80 and 97% polyvinyl acetate.

22. The improved plaster composition of Claim 16 wherein said plaster additive consists essentially of component (A) the saponified reaction product of at least one alkali metal carbonate with at least one fatty acid having about 16–18 carbon atoms, about 5.5 to about 8.5 parts by weight aluminum potassium sulfate, between about 5 and 25.5 parts aluminum silicate, and about 25 to about 70 parts silica, the total of said saponified reaction product of said alkali metal carbonate and said fatty acid being equal to the total of said three other noted components; and component (B) comprising between about 3 and 10% by weight polyvinyl alcohol and between about 90 and 97% of lignin sulphonate.

23. An improved cement plaster composition comprising about 75 parts by weight of portland cement, between about 20 parts and 150 parts of finely subdivided stone; between about 1 and 7 parts of the additive of Claim 1, and up to about 75 parts of hydrated lime.

24. The improved cement plaster composition of Claim 23 wherein said stone is limestone, and containing between about 20 and 30 parts of portland cement; containing between about 25 and 75 parts of hydrated lime and also containing up to about 5 parts of said additive.

25. The improved plaster composition of Claim 24 containing between about 1.5 and 2.5 parts of a plaster additive consisting essentially of component (A) the saponification reaction product of at least one alkali metal carbonate with at least one fatty acid having about 16–18 carbon atoms, about 5.5 to about 8.5 parts by weight of aluminum potassium sulfate, between about 5 and 25.5 parts of aluminum silicate, and about 25 to about 70 parts silica, the total of said saponified reaction product of said alkali metal carbonate and said fatty acid being about equal to the total of said three other noted components; and component (B) comprising at least one material selected from the group consisting of (i) polyvinyl alcohol and (ii) polyvinyl acetate, and containing at least about 30% weight of at least one alkali metal or ammonium salt of lignin sulphonate; the ratio of component (A) to component (B) being from about 16:1 to 16:5.

26. The improved plaster composition of Claim 25 wherein said component (B) contains between about 90% and 97% of ammonium lignin sulphonate and between about 10% and 3% of polyvinyl alcohol.

27. The improved plaster composition of Claim 25 wherein said component (B) contains between about 40% and 60% of ammonium lignin sulphonate and between about 60% and 40% of polyvinyl acetate.

28. The improved plaster composition of Claim 25 wherein said component (B) contains about 0.5 part of ammonium lignin sulphonate, about 3 parts of polyvinyl alcohol, about 6 parts of polyvinyl acetate, about 4 parts of calcium stearate and about 2 parts of gum arabic.

29. The improved plaster composition of Claim 23 containing between about 75 and 150 parts of limestone, between about 10 and 45 parts of hydrated lime, up to 5 parts of plaster additive consisting essentially of component (A) the saponified reaction product of at least one alkali metal carbonate with at least one fatty acid having about 16–18 carbon atoms, about 5.5 to about 8.5 parts by weight of aluminum potassium sulfate, between about 5 and 25.5 parts of aluminum silicate, and about 25 to about 70 parts silica, the total of said saponified reaction product of said alkali metal carbonate and said fatty acid being about equal to the total of said three other noted components; and component (B) comprising at least one material selected from the group consisting of (i) polyvinyl alcohol and (ii) polyvinyl acetate, and containing at least one alkali metal or ammonium salt of lignin sulphonate; the ratio of component (A) to component (B) being from about 16:1 to 16:5.

30. The improved plaster composition of Claim 29 containing between about 1.5 and 2.5 parts of said plaster additive and wherein said component (B) contains about 1 part of ammonium lignin sulphonate and about 2 parts of polyvinyl alcohol, and also contains about 4 parts of calcium stearate and about 2 parts of gum arabic.

31. The improved plaster composition of Claim 29 containing between about 1.5 and 2.5 parts of said plaster additive, said plaster additive comprising about equal parts (i) an admixture of component (A) with component (B) comprising about 40% ammonium lignin sulphonate and 60% polyvinyl acetate, and (ii) component (A) and component (B) comprising about 95% ammonium lignin sulphonate and about 5% polyvinyl alcohol.

32. The improved cement composition of Claim 29 containing between about 1.5 and 2.5 parts of said plaster additive and wherein said component (B) contains between about 40% and 60% of ammonium lignin sulphonate and between about 60% and 40% of polyvinyl acetate.

33. An improved lime plaster composition comprising about 75 parts by weight of hydrated lime; between about 1 and 7 parts of a plaster additive consisting essentially of component (A) the saponified reaction product of at least one alkali metal carbonate with at least one fatty acid having about 16–18 carbon atoms, about 5.5 to about 8.5 parts by weight of aluminum potassium sulfate, about 5 and 25.5 parts of aluminum silicate, and about 25 to about 70 parts silica, the total of said saponified reaction product of said alkali metal carbonate and said fatty acid being about equal to the total of said two other noted 11 components; and component (B) comprising at least two materials selected from the group consisting of (i) polyvinyl alcohol, (ii) polyvinyl acetate, and (iii) at least one alkali metal or ammonium salt of lignin sulphonate, each of said components (i), (ii) and/or (iii) when included in component (B) being at least 3% thereof; the ratio of component (A) to component (B) being from 16:1 to 16:16; and also containing a finely subdivided filler, the ratio of said filler to said hydrated lime being between about 1:1 and 1:4.

34. An improved cement plaster composition comprising about 75 parts by weight of portland cement, between about 20 parts and 150 parts of finely subdivided filler; between about 1 and 7 parts of the additive of Claim 1, and up to about 75 parts of hydrated lime.

35. The improved plaster composition of Claim 34 wherein said filler is at least one material selected from the group consisting of limestone, commercial sand, marble dust, perlite, vermiculite, expanded shale, foundry residue, steel fittings, resin-coated glass fibers, and gypsum.

36. The improved plaster composition of Claim 35 containing between about 20 and 30 parts of portland cement, and also containing up to about 5 parts of said additive.

37. The improved plaster composition of Claim 34 containing between about 75 and 150 parts of filler, between about 10 and 45 parts of hydrated lime, up to 5 parts of plaster additive consisting essentially of component (A) the saponified reaction product of at least one alkali metal carbonate with at least one fatty acid having about 16–18 carbon atoms, about 5.5 to about 8.5 parts by weight of aluminum potassium sulfate, between about 5 and 25.5 parts of aluminum silicate, and about 25 to about 70 parts silica, the total of said saponified reaction product of said alkali metal carbonate and said fatty acid being about equal to the total of said three other noted components; and component (B) comprising at least one material selected from the group consisting of (i) polyvinyl alcohol and (ii) polyvinyl acetate, and containing at least one alkali metal or ammonium salt of lignin sulphonate; the ratio of component (A) to component (B) being from about 16:1 to 16:5.

References Cited

UNITED STATES PATENTS

| | | | |
|---|---|---|---|
| 3,030,258 | 4/1962 | Wagner | 106—90 X |
| 3,117,882 | 1/1964 | Herschler et al. | 106—90 |
| 3,342,761 | 9/1967 | Wilkinson et al. | 106—90 X |
| 3,366,502 | 1/1968 | Lombardo et al. | 106—314 |
| 3,538,213 | 11/1970 | Robert | 264—225 |

DELBERT E. GANTZ, Primary Examiner

S. L. BERGER, Assistant Examiner

U.S. Cl. X.R.

106—95, 119, 120, 314

UNITED STATES PATENT OFFICE
CERTIFICATE OF CORRECTION

Patent No. 3,826,663                Dated July 30, 1974

Inventor(s) ALEXANDER S. MINICOZZI and ALEXANDER S. MINICOZZI, JR.

It is certified that error appears in the above-identified patent and that said Letters Patent are hereby corrected as shown below:

IN THE CLAIMS:

Claim 25, Lines 3 and 4, change "saponification" to --saponified--

Claim 35, Line 5, change "steel fittings" to --steel filings--

Signed and sealed this 29th day of October 1974.

(SEAL)
Attest:

McCOY M. GIBSON JR.            C. MARSHALL DANN
Attesting Officer              Commissioner of Patents